US008436753B2

(12) United States Patent
Eagleston et al.

(10) Patent No.: US 8,436,753 B2
(45) Date of Patent: May 7, 2013

(54) SYSTEM AND METHOD FOR EFFICIENTLY TRANSLATING MEDIA FILES BETWEEN FORMATS USING A UNIVERSAL REPRESENTATION

(75) Inventors: Walker J. Eagleston, Sunnyvale, CA (US); Kazuhisa Ohta, Sunnyvale, CA (US); Takayuki Mizuno, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 13/004,811

(22) Filed: Jan. 11, 2011

(65) Prior Publication Data

US 2012/0179700 A1     Jul. 12, 2012

(51) Int. Cl.
*H03M 7/00*     (2006.01)

(52) U.S. Cl.
USPC .............................................. 341/50; 709/218

(58) Field of Classification Search ................... 341/50; 709/218, 221, 228; 704/500, 220, 235, 221, 704/239, 228, 233
See application file for complete search history.

(56) References Cited

U.S. PATENT DOCUMENTS

| | | | |
|---|---|---|---|
| 7,505,825 B2 | 3/2009 | Wilson et al. | |
| 7,912,730 B2 | 3/2011 | Stewart et al. | |
| 2005/0038954 A1 | 2/2005 | Saliba | |
| 2006/0168114 A1* | 7/2006 | Glatron et al. | ................ 709/218 |
| 2010/0174916 A1 | 7/2010 | Setos | |

* cited by examiner

*Primary Examiner* — Joseph Lauture
(74) *Attorney, Agent, or Firm* — Blakely, Sokoloff, Taylor & Zafman LLP

(57) ABSTRACT

An apparatus and method are described for reading a file into a universal representation and translating from that universal representation into various file formats. For example, a method according to one embodiment comprises: reading compressed audio data from a first audio file, the first audio file comprising audio data compressed using a first compression algorithm and bookkeeping data having a first format, the bookkeeping data specifying a location of the compressed audio data within the first audio file; and generating a universal representation of the first audio file without decompressing and recompressing the audio data, the universal representation having bookkeeping data of a second format specifying the location of compressed audio data within the universal representation.

42 Claims, 11 Drawing Sheets

.mp4 Edit List 201

Edit Media Start Time = 2112
Edit Duration = 240000
- - -

*Fig. 2a*
*(prior art)*

.m4a File Metadata 202

Priming = 2112
Duration = 240000
Remainder = 576
- - -

*Fig. 2b*
*(prior art)*

.mov Edit List 203

Edit Media Start Time = 0 (2112 implied)
Edit Duration = 240000
- - -

Translating to .mp4

| | Sample Buffer 1 | Sample Buffer 2 | Sample Buffer 3 |
|---|---|---|---|
| Edit Media Start | 1024 | 0 | 0 |
| Edit Media Duration | 2048 | 3072 | 2542 |
| Edit Media Start Total | 1024 | 1024 | 1024 |
| Edit Media Duration Total | 2048 | 5120 | 7662 |

Fig. 5a

Translating to .m4a

| | Sample Buffer 1 | Sample Buffer 2 | Sample Buffer 3 |
|---|---|---|---|
| Priming | 1024 | 0 | 0 |
| Duration | 2048 | 3072 | 2542 |
| Remainder | 0 | 0 | 530 |
| | | | |
| Priming Total | 1024 | 1024 | 1024 |
| Duration Total | 2048 | 5120 | 7662 |
| Remainder Total | 0 | 0 | 530 |

*Fig. 5b*

Translating to .mov

| | Sample Buffer 1 | Sample Buffer 2 | Sample Buffer 3 |
|---|---|---|---|
| Edit Media Start | 960 | 0 | 0 |
| Edit Media Duration | 2048 | 3072 | 2542 |
| Edit Media Start Total | 960 | 960 | 960 |
| Edit Media Duration Total | 2048 | 5120 | 7662 |

SYSTEM AND METHOD FOR EFFICIENTLY TRANSLATING MEDIA FILES BETWEEN FORMATS USING A UNIVERSAL REPRESENTATION

BACKGROUND

1. Field of the Invention

This invention relates generally to the field of data processing systems. More particularly, the invention relates to an improved system and method for translating media files between formats using a universal representation.

2. Description of the Related Art

A variety of different encoding formats exist for digital audio such as the ISO MP-4 file format (.mp4 files), the iTunes file format (.m4a files), and the QuickTime file format (.mov files). While these different file formats maintain indexing information and other metadata somewhat differently, all three file types may use the same codec to encode the underlying audio content (e.g., such as Advanced Audio Coding (AAC)).

The process of encoding a source audio stream into a sequence of AAC audio packets (the compressed domain) introduces some amount of "encoder delay" (sometimes called "priming" and measured in audio samples). When these audio packets are subsequently decoded back to the Pulse Code Modulation (PCM) domain, the source waveform will be offset in its entirety by this encoder delay amount. Additionally, encoded audio packets will typically each carry a fixed number of audio samples (e.g., 1024) possibly requiring additional trailing or "remainder" samples following the last source sample so as to pad the final audio packet.

Technically, the AAC encoding uses a transform over consecutive sets of 2048 samples, but applied every 1024 samples (hence overlapped). For correct audio to be decoded, both transforms for any period of 1024 samples are needed. For this reason, encoders add at least 1024 samples of silence before the first "true" audio sample, and often add more (commonly 2112 samples, for various reasons). The term "encoder delay" used to refer to these samples is perhaps a confusing term as it refers to an offset and extra data in the encoded stream, and not (for example) to a real-time delay, or a delay between feeding data into an encoder or decoder and getting data out. However the term "encoder delay" is commonly used by those of ordinary skill in the art and will be used in the present application.

Figure 1A:
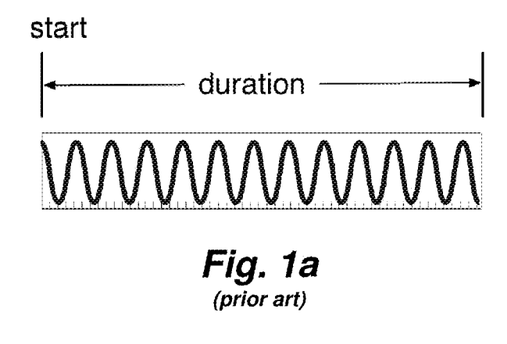
FIGS. 1a-c illustrate the phenomenon of encoder delay and remainders within an encoded audio file.
Figure 1B:
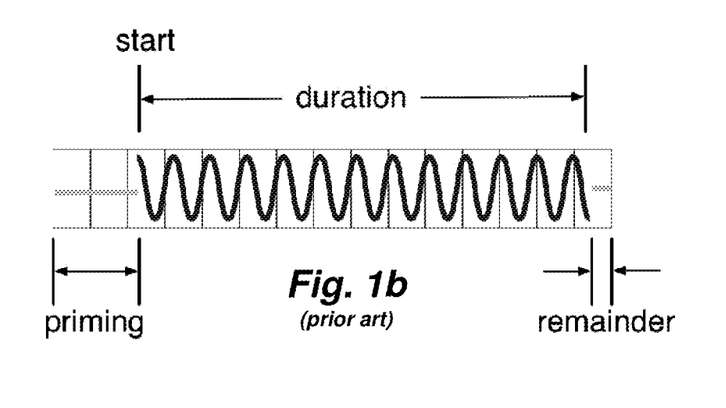
Figure 1C:
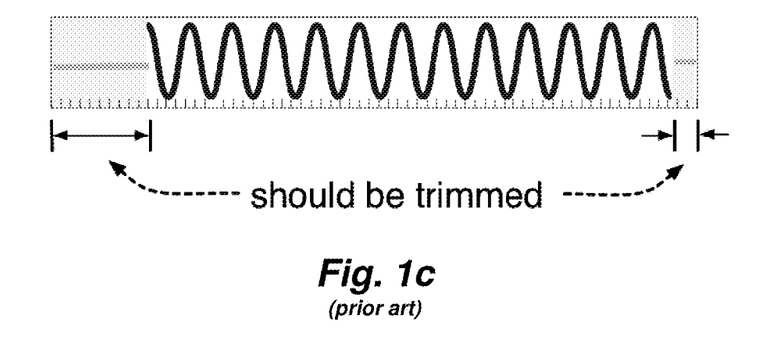

By way of example, FIG. 1a illustrates an uncompressed source audio that may be encoded to a sequence of AAC audio packets (aka "access units" or "AUs") as shown in FIG. 1b. As illustrated, the audio is quantized into packets and offset by the "priming" duration. Additionally, there may be "remainder" samples following the end of the source to account for filling to the packet sample count size.

Consequently, to recover and present the original waveform from the compressed audio packets, it is necessary to trim the decoded audio samples within this encoder delay period and to trim any remainder audio samples as shown in FIG. 1c. Additionally, this overhead should not be accounted for in the duration of the track as these samples are an artifact of the encoding process and don't represent useful signal. As the amount of encoder delay may vary depending upon the encoder (software or hardware) and the encoder configuration used, it is necessary that the media container for storing the audio content indicate the placement of the source signal in the compressed stream.

The three file formats mentioned above, .mp4, .m4a, and .mov, each use a different media container format to indicate the placement of the original source signal. An .mp4 file, for example, typically uses an "edit list" data structure to indicate what range of time from the access units to present. An .m4a file does not use an edit list but instead uses metadata associated with the file containing "priming," "duration," and "remainder" values to indicate the location of audio content within the file. Finally, a .mov file uses an edit list but includes an implicit offset to identify the start of the audio content within the file.

Figure 2A:
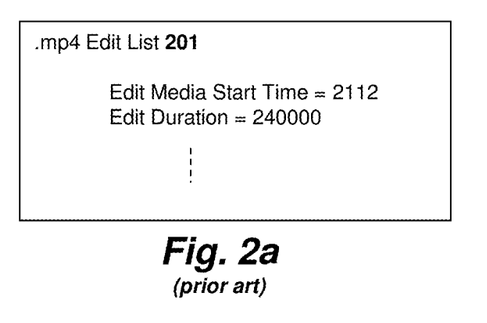
FIGS. 2a-c illustrate how encoder delay and remainder information is maintained for three different file types.
Figure 2B:
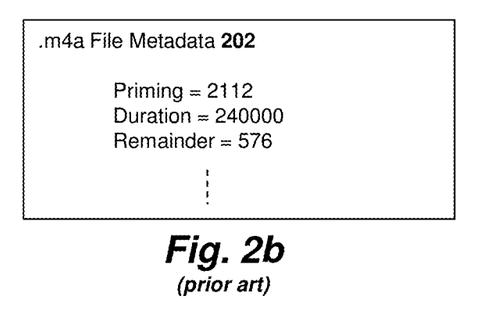
Figure 2C:
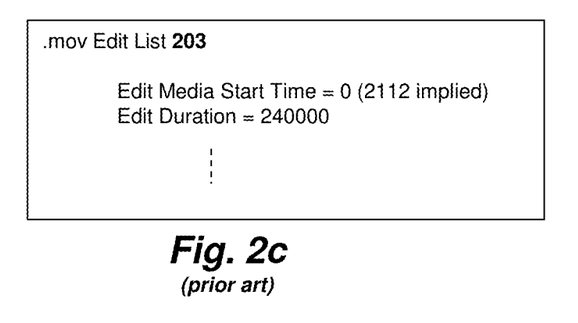

By way of example, and not limitation, FIGS. 2a-c illustrate how this bookkeeping data is stored using these three file types assuming 1024 samples per access unit (aka "audio packet"), an encoder delay of 2112 samples, an audio sample duration of 240000 samples, and a remainder of 576 samples. As shown in FIG. 2a, the Edit List (aka "EditListBox") data structure 201 specifies an edit media start time of 2112 samples with a duration of 24000 samples. The remainder of 576 samples is assumed since each access unit is 1024 samples and the above example requires 237 access units given the encoder delay and audio sample duration (i.e., 237 AUs*1024 samples/AU=242688 samples total and 242688−(2112+240000)=576). As shown in FIG. 2b, instead of an Edit List data structure, the .m4a file includes metadata 202 with a priming value of 2112 samples, a duration of 240000 samples, and a remainder of 576 samples. Finally, as illustrated in FIG. 2c, the .mov file uses an Edit List data structure, but the value of 2112 samples is implied for the encoder delay. That is, the Edit List data structure 203 specifies an edit media start time of zero even though the audio content contained in the file does not start until after the first 2112 audio samples. Thus, any application reading the .mov file must know to add 2112 audio samples to the edit media start time specified in the edit list (i.e., the entirety of an edit to a .mov file is shifted by an implicit 2112 audio samples).

SUMMARY

An apparatus and method are described for translating between audio formats without compressing and recompressing audio content. For example, a method according to one embodiment comprises: reading compressed audio data from a first audio file, the first audio file comprising audio data compressed using a first compression algorithm and bookkeeping data having a first format, the bookkeeping data specifying a location of the compressed audio data within the first audio file; and generating a universal representation of the first audio file without decompressing the audio data, the universal representation having bookkeeping data of a second format specifying the location of compressed audio data within the universal representation.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention translates between different audio formats using a universal audio representation, without decompressing and then recompressing the underlying audio content. As described above, a variety of different digital audio file formats may use the same underlying audio compression algorithm (e.g., Advanced Audio Coding (AAC)). As such, in one embodiment, when converting from one file format to another, only the bookkeeping data used to identify the location of playable audio content within each of these file formats is rearranged, thereby preserving time and resources and avoiding potential loss of data. It should be noted that while one embodiment of the invention is described below within the context of certain specific audio file formats, the underlying principles of the invention are not limited to any particular audio file format.

Figure 3:
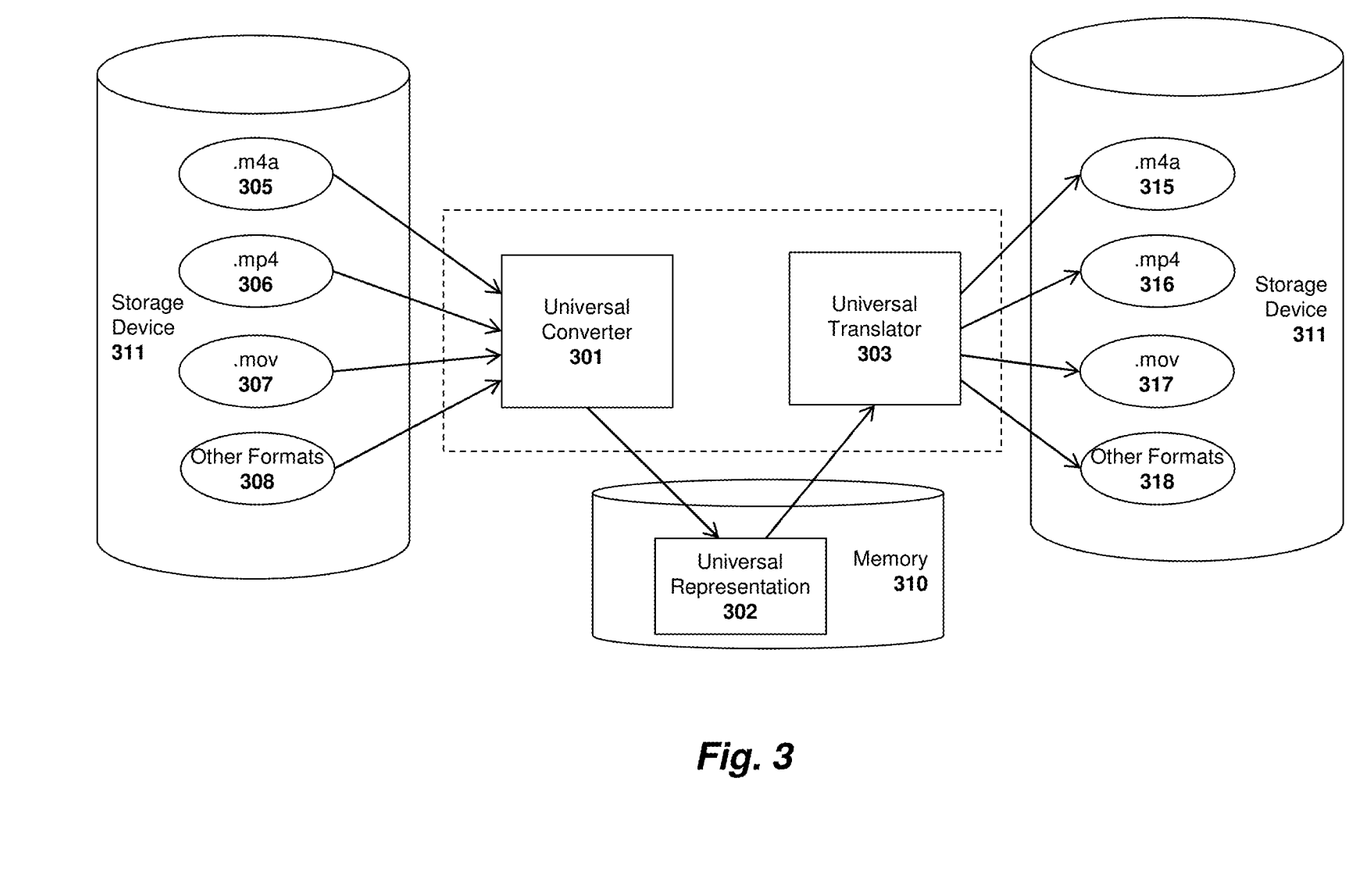
FIG. 3 illustrates an architecture for translating between audio formats and a universal representation according to one embodiment of the invention.

As illustrated in FIG. 3, one embodiment of the invention comprises a universal converter 301 for converting audio content stored in a variety of different audio file types including .m4a files 305, .mp4 files 306, .mov files 307, and other audio formats 308 into a universal representation 302. Once stored in the universal representation 302, a universal translator 303 may be used to translate the universal representation 302 into any of the supported audio types 315-318, as illustrated (e.g., in response to requests from applications such as iTunes® and QuickTime® which require these specific audio types).

As illustrated in FIG. 3, in one embodiment, .m4a files 305, .mp4 files 306, .mov files 307 are read from a storage device 311 (e.g., a hard drive or other mass storage device) into memory 310 (e.g., Synchronous dynamic random access memory (SDRAM)) where they are converted into the universal representation 302 by the universal converter 301. The universal translator 303 may then translate the universal representation into 303 any of the supported audio types 315-318 and store the results back to the storage device 311. In one embodiment, the universal translator 303 and universal converter 301 are implemented as program code executed by a processor. However, the underlying principles of the invention are not necessarily limited to a software implementation.

In one embodiment, the universal representation 302 comprises a stream of data structures referred to herein as "sample buffers." Each sample buffer may contain multiple AAC Access Units (also sometimes referred to as "audio packets"). In one embodiment, the sample buffer size is selected to be a multiple of the access unit size. In one specific example which will be described below with respect to FIG. 4, each access unit is 1024 samples and each sample buffer contains three access units or 3072 samples. In the illustrated example, the encoder delay of the audio file converted to the universal representation is assumed to be 1024 samples and the remainder is assumed to be 530 samples. In addition, the complete audio file converted to the universal representation is assumed to be 9 access units in length.

In one embodiment, the universal converter 301 begins converting the source file 305-308 to sample buffers and the universal translator begins translating the sample buffers before the entire source file is read into memory. For example, the universal converter 301 may read one sample buffer's worth of data, generate the sample buffer, and the universal translator may then translate that sample buffer to the destination file format 315-318 before the entire source file is read into memory and/or converted to sampler buffers. Moreover, in one embodiment, the universal converter 301 and universal translator 303 process multiple sample buffers concurrently. For example, the universal converter 301 may be concurrently generating a plurality of sample buffers while the universal translator 303 is translating a plurality of completed sample buffers. The number of sample buffers which may be processed concurrently (i.e., "in-flight") at any given time depends on the computing resources of the platform on which the universal converter 301 and universal translator 303 are executed (e.g., based on the number of concurrent threads the computing platform is capable of 锗啡鋠　電을松 儀 帀 n one embodiment, the sample buffers are serialized In one embodiment, the sample buffers are serialized into data blocks such as data blobs to enable data transfers between processes running on a single device (e.g., in a client server relationship). In this embodiment, the universal converter 301 and translator 303 are implemented as server processes which expose an application programming interface (APIs) to enable communication with client processes. The serialization into data blobs is used to allow clients to access the serial buffers in between the converter 301 and translator 303 which both run on the server. For example, transferring from the universal converter 301 to a client process requires a serialization on the server process side, and deserialization on the client process side. Then transferring from the client to the universal translator 303 requires a serialization on the client process side and a deserialization on the server process side. Those of ordinary skill in the art will readily understand the serialization techniques which may be used for exchanging data between processes. It should be noted, however, that such a client/server configuration is not necessary for complying with the underlying principles of the invention.

In one embodiment, the universal converter 301 includes program code for reading the various different file formats shown in FIG. 3. If the file is an .m4a file 305, for example, the universal converter 301 includes program code for reading the priming, duration and remainder values from the file metadata to generate the universal representation 302. Similarly, if the file is an .mp4 file 306, then the universal converter 301 includes program code for reading the media start time and the duration from the file's edit list. Finally, in the case of a .mov file 307, the universal converter 301 includes program code which is aware of the implicit media start time value of 2112 samples. Thus, if the edit list data structure shows a media start time of 0, the universal converter 301 knows that the start of actual media content does not appear until after an encoder delay of 2112 samples. The universal converter 301 may be configured with additional program code for reading and converting various other file formats 308 consistent with the underlying principles of the invention.

Figure 4:
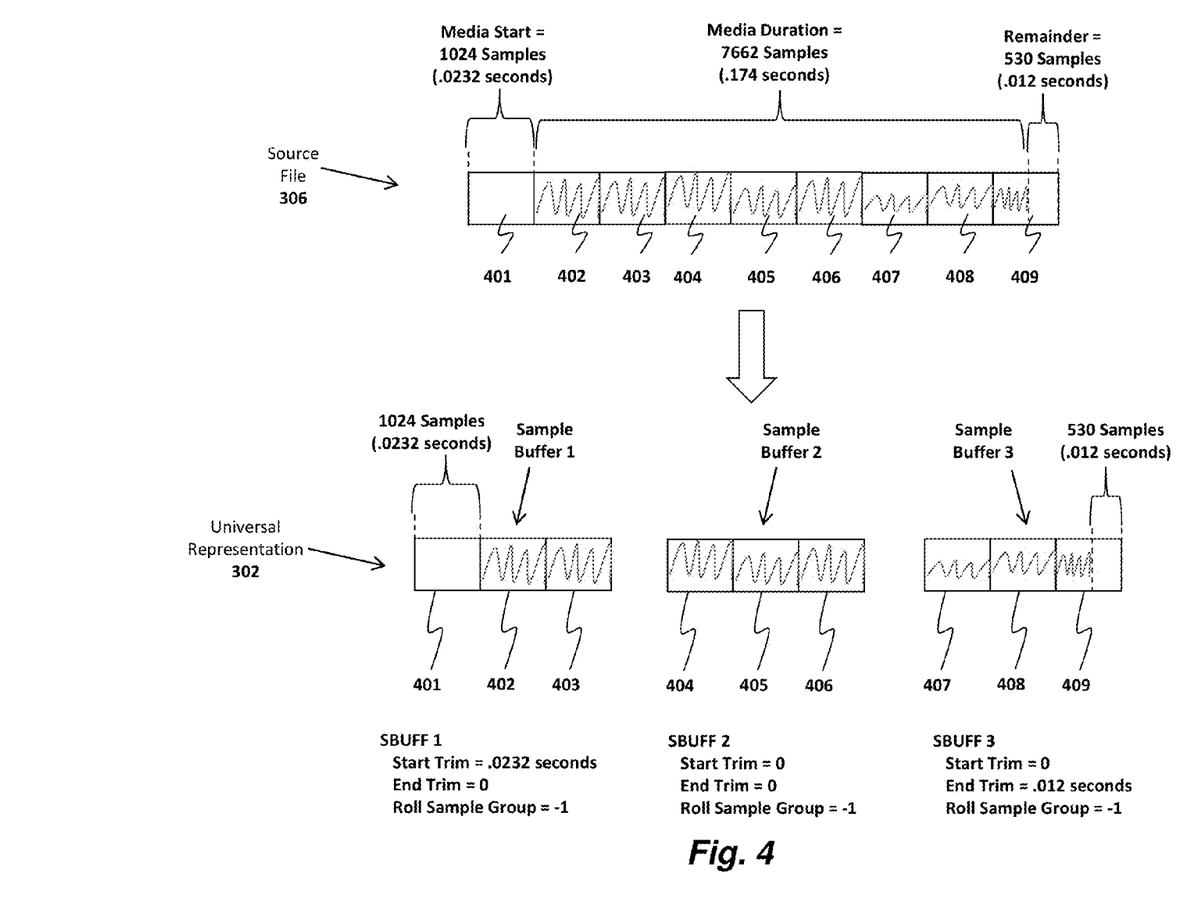
FIG. 4 illustrates one embodiment of a source file and a corresponding universal representation.

Returning to FIG. 4, in one embodiment, the universal converter reads the access units 401-409 from the source file according to its file format (which in the specific example shown in FIG. 4 is an .mp4 file) and builds the sample buffers sequentially. In one embodiment, each sample buffer includes a "start trim" value which indicates the time from the start of the sample buffer at which playable audio content begins and an "end trim" value which indicates the time measured from the end of the sample buffer at which the playable audio content ends. Thus, the first sample buffer (Sample Buffer 1) in FIG. 4 is generated using the first three access units of the source file, which includes the encoder delay of 1024 samples (one access unit in the example) or 1024/44100=0.0232 seconds assuming a sample rate of 44,100 samples/second. As such, Sample Buffer 1 is generated using a "start trim" value of 0.0232 seconds. Because Sample Buffer 1 ends with audio content (i.e., there is no remainder value), the end trim value for sample Buffer 1 is 0. Sample Buffer 2 is then generated using a Start Trim value of 0 and an End Trim value of 0. Finally, Sample Buffer 3 is generated using the final three access units 407-409 of the source file, which includes the remainder of 530 samples. Thus, Sample Buffer 3 includes a Start Trim value of 0 and an End Trim value of 0.012 seconds (530 samples/44,100 samples/second=0.012 seconds).

It should be noted that units other than seconds may be used for the Start Trim and End Trim values while still complying with the underlying principles of the invention. For example, the Start and End Trim values may be expressed in terms of samples rather than seconds, or any other convenient format for determining the start and end of playable audio content (e.g., bits, bytes, etc).

In one embodiment, a roll sample group value is also determined from the source file and stored with the universal representation. The roll sample group value indicates the number of prior access units needed to start audio playback from a selected access unit (e.g., in response to a user selecting playback from the middle of an audio track). A value of −1 is shown in the example to indicate that one complete access unit is required to start playback from a particular access unit. Thus, for example, to start playback from access unit 406, the audio content from access 405 is needed. It should be noted, of course, that the underlying principles of the invention are not limited to any particular value for the roll sample group.

In one embodiment, the Universal Translator 303 reads the universal representation to generate a media file in one of more of the supported file formats 315-318. In this manner, a file may be readily converted from one format to another format without decompressing and then recompressing the underlying audio content. For example, the universal converter 301 may convert an .mp4 file to the universal representation 302 by packing the original compressed audio data into sample buffers and specifying start and end trim values. The universal translator 303 may subsequently read the audio data from the universal representation to generate an .m4a file (e.g., in response to a requesting application) without compressing/decompressing the audio data. Consequently, converting between audio file types using the techniques described herein is more efficient than prior techniques (which required the decompression and recompression of the underlying audio).

Figure 5A:
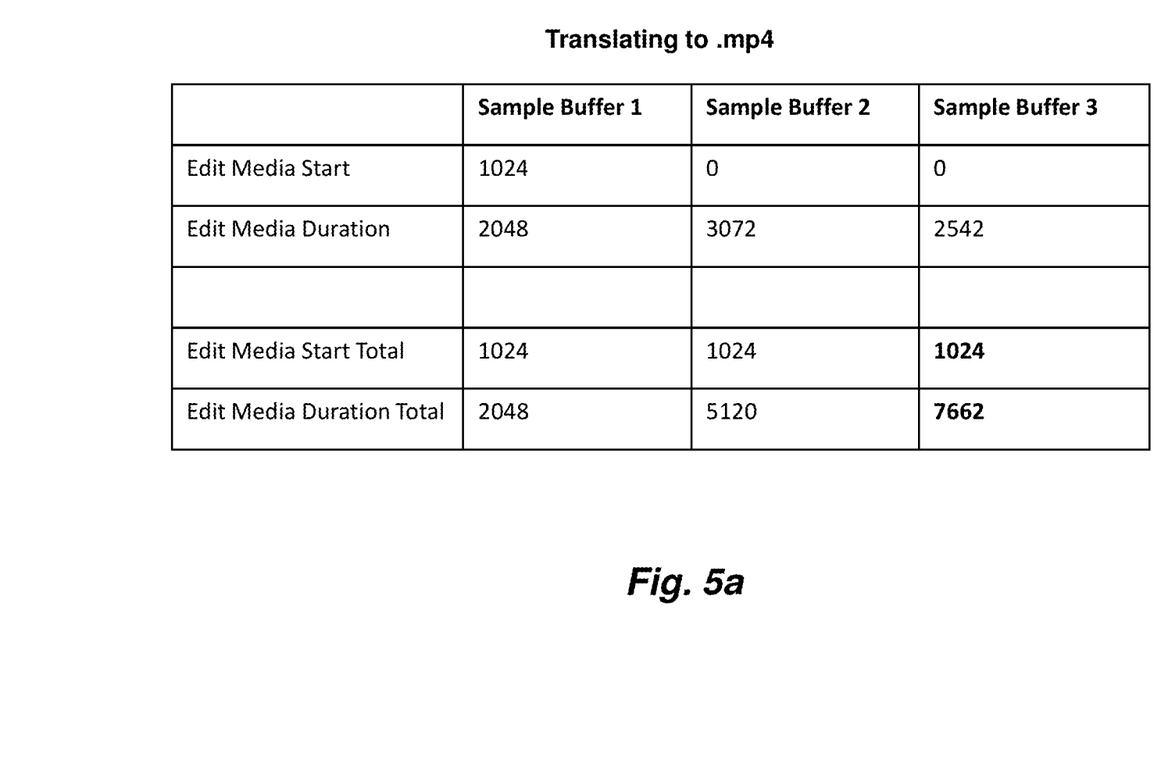
FIGS. 5a-c illustrate bookkeeping data employed in one embodiment of the invention to track the start and end of playable audio content.

The table shown in FIG. 5*a* will be used to describe how embodiments of the universal translator 303 may translate the universal representation 302 to an .mp4 media file. The first two rows show what the Edit Media Start and Edit Media Duration values would be if each individual sample buffer were encoded with its own edit list. In this specific example, Sample Buffer 1 is converted to an .mp4 file having an edit list with an Edit Media Start value of 1024 samples (to account for the encoder delay specified by the start trim value of 0.0232 seconds=1024 samples) and an Edit Media Duration of 2048 samples (the equivalent of two access units in the example). Because Sample Buffer 2 is filled with nothing but audio content, its .mp4 file would have an Edit Media Start value of zero and an Edit Media Duration of 3072 samples (i.e., all of the samples of the sample buffer). Finally, Sample Buffer 3 starts with no start trim and an end trim of 0.012 seconds (equivalent to 530 samples), which translates to an Edit Media Start value of 0 and an Edit Media Duration of 2542 samples (i.e., 1024×2 full access units+(1024−530) end trim amount for the last access unit).

The final two rows in the table shown in FIG. 5*a* show the running totals as the universal translator 303 reads the universal representation from start to finish. Specifically, at the end of Sample Buffer 1, the values are an Edit Media Start total of 1024 samples and an Edit Media Duration total of 2048 samples. At the end of Sample Buffer 2, the Edit Media Start total remains the same (i.e., because sample buffer 2 has a start trim value of 0) and the Edit Media Duration total is increased by 3072 to 5120 total samples. Finally, at the end of Sample Buffer 3, the Edit Media Start remains at 1024 (because the start trim value for Sample Buffer 3 is 0) and the Edit Media Duration is increased by 3072−530=2542, for a final Edit Media Duration value of 7662.

In one embodiment, the universal translator 303 combines the contents of all of the sample buffers to generate an .mp4 file with the Edit Media Start Total and Edit Media Duration total values. Alternatively, the universal translator 303 may generate an .mp4 file (or multiple files) with multiple edit values. For example, a new edit may be started each time a new non-zero start trim or end trim value is detected.

Figure 5B:
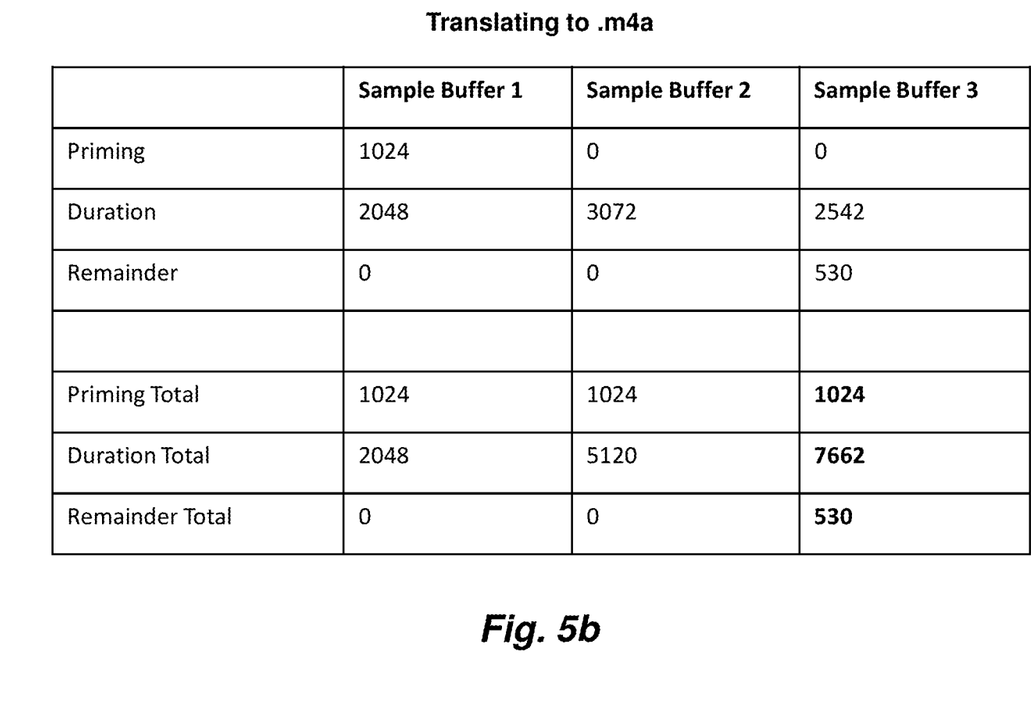

The table shown in FIG. 5*b* will be used to describe how embodiments of the universal translator 303 may translate the universal representation 302 to an .m4a media file. The first three rows show what the priming, duration, and remainder values would be if each individual sample buffer were encoded with its own edit list. In the specific example illustrated, Sample Buffer 1 be converted to an .m4a file having an edit list with a priming value of 1024 samples (to account for the encoder delay specified by the start trim value of 0.0232 seconds=1024 samples) and a duration of 2048 samples (the equivalent of two access units in the example), and a remainder value of zero. Because Sample Buffer 2 is filled with nothing but audio content, its .m4a file would have a priming and remainder equal to zero, and a duration equal to the total size of the sample buffer—i.e., 3072 samples. Finally, Sample Buffer 3 starts with no start trim and an end trim of 0.012 seconds (equivalent to 530 samples), which translates to a priming value of zero, a duration of 2542 samples (i.e., 1024×2 full access units+(1024−530) end trim amount for the last access unit), and a remainder of 530.

The final three rows in the table shown in FIG. 5*b* show the running totals as the universal translator 303 reads the universal representation from start to finish. Specifically, at the end of Sample Buffer 1, the values are a priming total of 1024 samples, a duration total of 2048 samples, and a remainder total of zero. At the end of Sample Buffer 2, the priming total remains the same (i.e., because sample buffer 2 has a start trim value of 0) and the duration total is increased by 3072 to 5120 total samples. At the end of Sample Buffer 3, the priming total remains at 1024 (because the start trim value for Sample Buffer 3 is 0) and the duration total is increased by 3072−530=2542, for a duration value of 7662. Finally, Sample Buffer 3 includes an end trim amount equal to 0.012 seconds, which translates to a remainder of 530 samples.

In one embodiment, the universal translator 303 combines the contents of all of the sample buffers to generate an .m4a file with the priming total of 1024, the duration total of 7662 and the remainder total of 530 (which as described above, is stored not in an edit list structure but rather as metadata with the .m4a file). Alternatively, the universal translator 303 may generate an .m4a file (or multiple files) with multiple edit values. For example, new priming and remainder values may be generated each time a new non-zero start trim or end trim value is detected in a sample buffer. In one embodiment, the duration value is updated each time a sample buffer is added which has playable audio content (i.e., including untrimmed sample buffers).

Figure 5C:
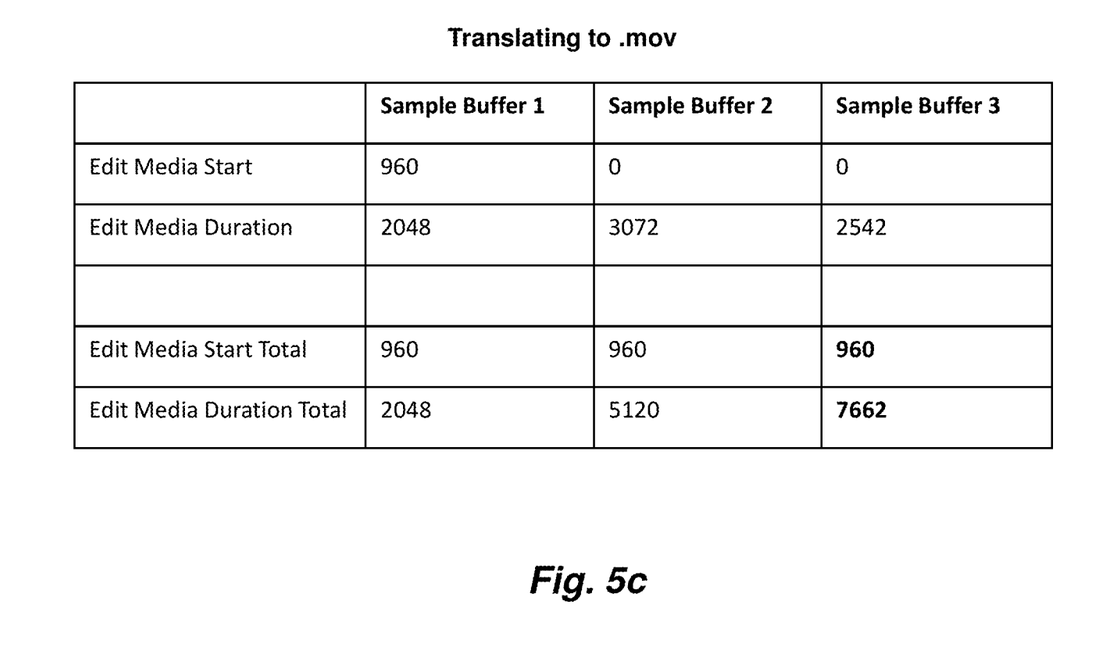

The table shown in FIG. 5c will be used to describe how embodiments of the universal translator 303 may translate the universal representation 302 to an QuickTime (e.g., .mov) media file. As previously mentioned, one difference between the .mov format and the .mp4 format is that the .mov format has an implicit edit media start value of 2112 samples. As such, this value must be factored in when translating between the universal representation and the .mov file format so that applications which assume the implicit 2112 samples will process the translated file correctly. In the example used herein with respect to FIGS. 5a-c, the encoder delay assumed for the source file is 1024 samples which is (in the example) equal to one access unit. Because 1024 samples is insufficient to represent 2112 samples, this embodiment of the invention prepends additional access units to the start of the .mov media file as part of the translation process. It then updates the edit media start value with the knowledge of these prepended access units. In one embodiment, to ensure compatibility, the first access unit from the universal representation is simply duplicated a specified number of times as needed. Turning to the specific numbers in the above example, for an access unit size 1024 samples and an encoder delay of 1024 samples, two additional access units are prepended to the beginning of the .mov file after reading sample buffer 1, resulting in 1024× 2=2048 samples and the edit media start value is set to 960 (i.e., because 2112+960=3072, which is where the start of the playable audio content will be after the two additional access units are added). After these calculations, the remaining values are added in the same manner as for the .mp4 file described above. Specifically, the Edit Media Duration and Edit Media Duration Totals remain the same and the edit Media Start total remains at 960 samples for the final .mov file.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention described above are implemented with program code (e.g., software), the underlying principles of the invention may be implemented using any combination of hardware, software and/or firmware. Accordingly, the scope and spirit of the invention should be judged in terms of the claims below.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 6:
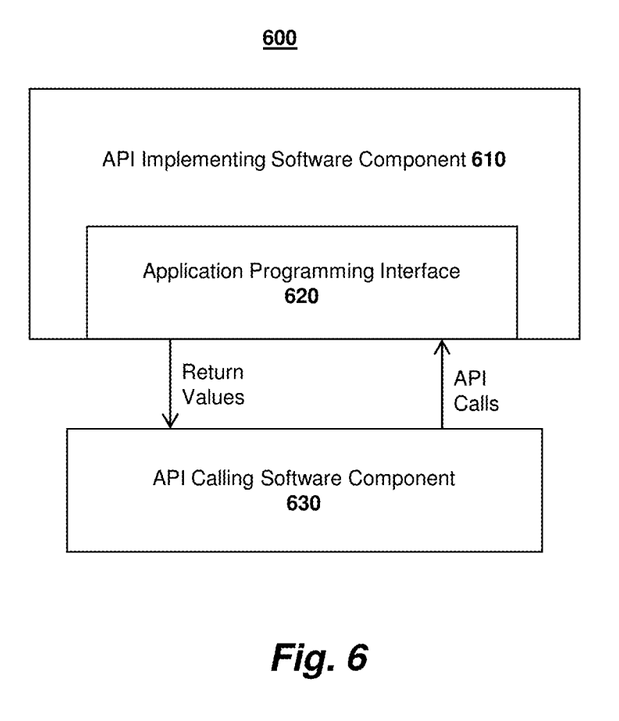
FIG. 6 illustrates a block diagram of an exemplary API architecture useable in some embodiments of the present invention.

FIG. 6 is a block diagram illustrating an exemplary API architecture, which may be used in some embodiments of the invention. As shown in FIG. 6, the API architecture 600 includes the API-implementing component 610 (e.g., an operating system, a library, a device driver, an API, an application program, software or other module) that implements the API 620. The API 620 specifies one or more functions, methods, classes, objects, protocols, data structures, formats and/or other features of the API-implementing component that may be used by the API-calling component 630. The API 620 can specify at least one calling convention that specifies how a function in the API-implementing component receives parameters from the API-calling component and how the function returns a result to the API-calling component. The API-calling component 630 (e.g., an operating system, a library, a device driver, an API, an application program, software or other module), makes API calls through the API 620 to access and use the features of the API-implementing component 610 that are specified by the API 620. The API-implementing component 610 may return a value through the API 620 to the API-calling component 630 in response to an API call.

It will be appreciated that the API-implementing component 610 may include additional functions, methods, classes, data structures, and/or other features that are not specified through the API 620 and are not available to the API-calling component 630. It should be understood that the API-calling component 630 may be on the same system as the API-implementing component 610 or may be located remotely and accesses the API-implementing component 610 using the API 620 over a network. While FIG. 6 illustrates a single API-calling component 630 interacting with the API 620, it should be understood that other API-calling components, which may be written in different languages (or the same language) than the API-calling component 630, may use the API 620.

The API-implementing component 610, the API 620, and the API-calling component 630 may be stored in a tangible machine-readable storage medium, which includes any mechanism for storing information in a form readable by a machine (e.g., a computer or other data processing system). For example, a tangible machine-readable storage medium includes magnetic disks, optical disks, random access memory (e.g. DRAM); read only memory, flash memory devices, etc.

Figure 7:
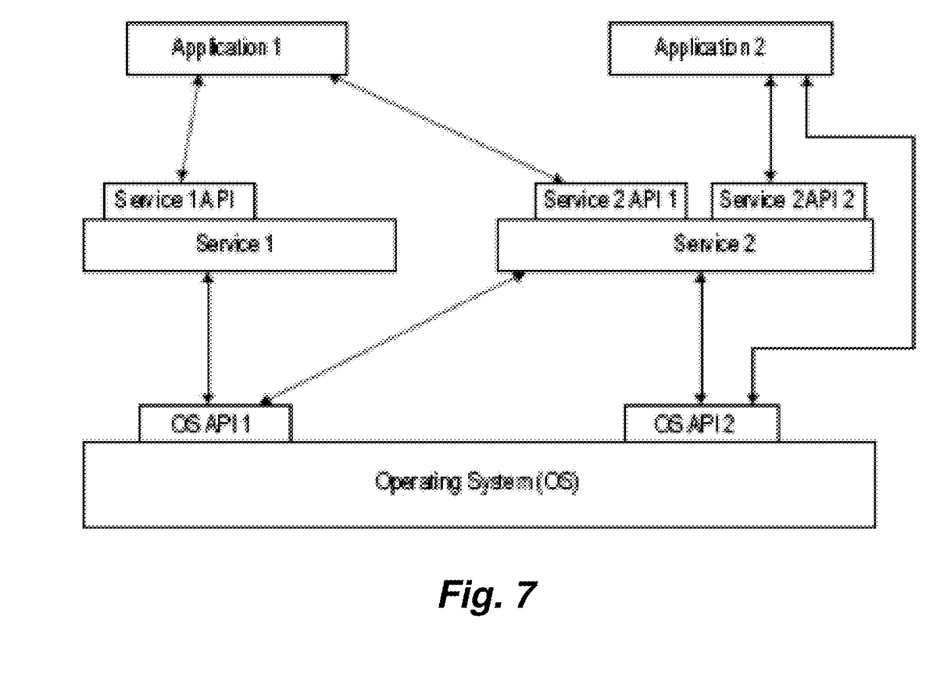
FIG. 7 shows an exemplary embodiment of a software stack useable in some embodiments of the present invention.

In FIG. 7 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 8:
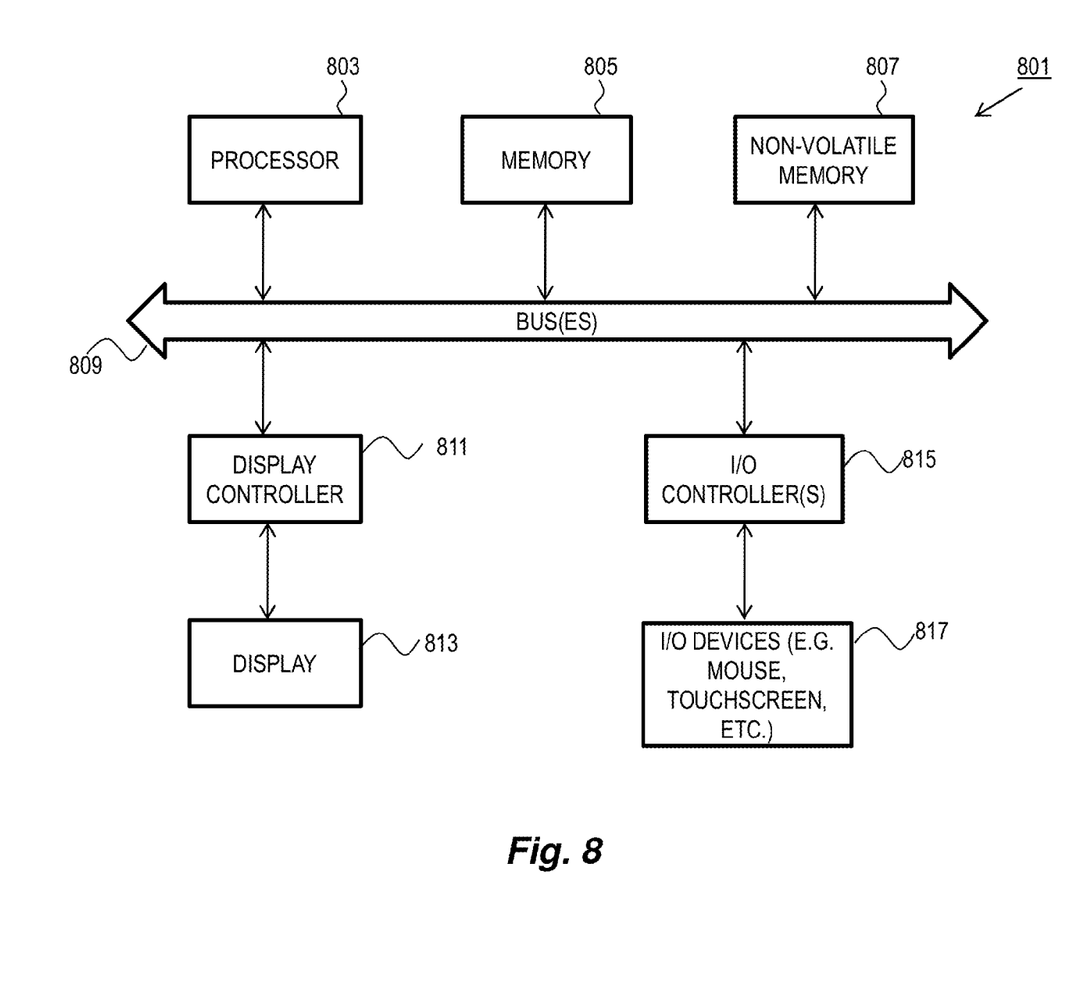
FIG. 8 shows, in block diagram form, an example of a data processing system which can be used with one or more embodiments described herein.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device. FIG. 8 shows one example of a typical data processing system which may be used with the present invention. Note that while FIG. 8 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 8 may also be used with the present invention. The data processing system of FIG. 8 may be a Macintosh computer from Apple Inc. of Cupertino, Calif. (e.g., a Mac or a MacBook Pro). As shown in FIG. 8, the data processing system 801 includes one or more buses 809 which serve to interconnect the various components of the system. One or more processors 803 are coupled to the one or more buses 809 as is known in the art. Memory 805 may be DRAM or non-volatile RAM or may be flash memory or other types of memory. This memory is coupled to the one or more buses 809 using techniques known in the art. The data processing system 801 can also include non-volatile memory 807 which may be a hard disk drive or a flash memory or a magnetic optical drive or magnetic memory or an optical drive or other types of memory systems which maintain data even after power is removed from the system. The non-volatile memory 807 and the memory 805 are both coupled to the one or more buses 809 using known interfaces and connection techniques. A display controller 811 is coupled to the one or more buses 809 in order to receive display data to be displayed on a display device 813 which can display any one of the user interface features or embodiments described herein. The display device 813 can include an integrated touch input to provide a touch screen. The data processing system 801 can also include one or more input/output (I/O) controllers 815 which provide interfaces for one or more I/O devices, such as one or more mice, touch screens, touch pads, joysticks, and other input devices including those known in the art and output devices (e.g. speakers). The input/output devices 817 are coupled through one or more I/O controllers 815 as is known in the art. While FIG. 6 shows that the non-volatile memory 807 and the memory 805 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 809 may include one or more bridges or controllers or adapters to interconnect between various buses. In one embodiment, the I/O controller 815 includes a USB adapter for controlling USB peripherals and can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 805 or the non-volatile memory 807 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
    reading compressed audio data from a first audio file, the first audio file comprising audio data compressed using a first compression algorithm and bookkeeping data having a first format, the bookkeeping data specifying a location of the compressed audio data within the first audio file; and
    generating a universal representation of the first audio file without decompressing and recompressing the audio data, the universal representation having bookkeeping data of a second format specifying the location of compressed audio data within the universal representation.

2. The method as in claim 1 wherein generating the universal representation comprises:
    packing the audio data compressed using the first compression algorithm into a plurality of sample buffers.

3. The method as in claim 2 wherein the second bookkeeping data comprises a start trim value and an end trim value associated with each of the sample buffers, the start trim value indicating the location of the start of playable audio data within each sample buffer and the end trim value indicating the end of playable audio data within each sample buffer.

4. The method as in claim 1 wherein the first audio data is stored within the first audio file in a plurality of fixed-size access units and wherein generating the universal representation comprises packing the fixed-size access units into a plurality of fixed-size audio data structures, the fixed-size audio data structures of the universal representation being larger than or equal to the fixed-size access units of the first audio file.

5. The method as in claim 4 wherein the fixed-size access units of the universal representation are an integer multiple of the fixed-size access units of the first audio file.

6. The method as in claim 4 wherein the bookkeeping data is packed into the fixed-size audio data structures of the universal representation along with the fixed-size access units.

7. The method as in claim 1 wherein the bookkeeping data having the first format comprises an edit list with a media start time indicating the start of playable audio content within the first audio file and a duration indicating a length of the playable audio content within the first audio file.

8. The method as in claim 1 further comprising:
    reading compressed audio data from a second audio file, the second audio file comprising audio data compressed using the first compression algorithm and bookkeeping data having a third format different from the first format and the second format, the bookkeeping data having the third format specifying a location of the compressed audio data within the second audio file; and
    generating a universal representation of the second audio file without decompressing and recompressing the audio data, the universal representation having bookkeeping data of the second format specifying the location of compressed audio data within the universal representation.

9. The method as in claim 1 further comprising:
translating the universal representation of the first audio file into a second audio file, the second audio file comprising audio data compressed using the first compression algorithm but bookkeeping data having a third format, the bookkeeping data specifying a location of the compressed audio data within the second audio file.

10. The method as in claim 9 wherein the bookkeeping data having the first format comprises a priming value indicating a start of the compressed audio data within the first audio file and a remainder value specifying an end of the compressed audio data within the first audio file.

11. The method as in claim 10 wherein the bookkeeping data having the third format comprises an edit media start time indicating a start of the compressed audio data within the second audio file, and a duration value indicating an end of the compressed audio data within the second audio file.

12. The method as in claim 11 wherein the first audio file is an .m4a file, the second audio file is an .mp4 file and the first compression algorithm comprises an Advanced Audio Coding (AAC) algorithm.

13. A machine-readable medium having program code stored thereon which, when executed by a machine, causes the machine to perform the operations of:
reading compressed audio data from a first audio file, the first audio file comprising audio data compressed using a first compression algorithm and bookkeeping data having a first format, the bookkeeping data specifying a location of the compressed audio data within the first audio file; and
generating a universal representation of the first audio file without decompressing and recompressing the audio data, the universal representation having bookkeeping data of a second format specifying the location of compressed audio data within the universal representation.

14. The machine-readable medium as in claim 13 wherein generating the universal representation comprises:
packing the audio data compressed using the first compression algorithm into a plurality of sample buffers.

15. The machine-readable medium as in claim 14 wherein the second bookkeeping data comprises a start trim value and an end trim value associated with each of the sample buffers, the start trim value indicating the location of the start of playable audio data within each sample buffer and the end trim value indicating the end of playable audio data within each sample buffer.

16. The machine-readable medium as in claim 13 wherein the first audio data is stored within the first audio file in a plurality of fixed-size access units and wherein generating the universal representation comprises packing the fixed-size access units into a plurality of fixed-size audio data structures, the fixed-size audio data structures of the universal representation being larger than or equal to the fixed-size access units of the first audio file.

17. The machine-readable medium as in claim 16 wherein the fixed-size access units of the universal representation are an integer multiple of the fixed-size access units of the first audio file.

18. The machine-readable medium as in claim 16 wherein the bookkeeping data is packed into the fixed-size audio data structures of the universal representation along with the fixed-size access units.

19. The machine-readable medium as in claim 13 wherein the bookkeeping data having the first format comprises an edit list with a media start time indicating the start of playable audio content within the first audio file and a duration indicating a length of the playable audio content within the first audio file.

20. The machine-readable medium as in claim 13 comprising additional program code to cause the machine to perform the operations of:
reading compressed audio data from a second audio file, the second audio file comprising audio data compressed using the first compression algorithm and bookkeeping data having a third format different from the first format and the second format, the bookkeeping data having the third format specifying a location of the compressed audio data within the second audio file; and
generating a universal representation of the second audio file without decompressing the audio data, the universal representation having bookkeeping data of the second format specifying the location of compressed audio data within the universal representation.

21. The machine-readable medium as in claim 13 comprising additional program code to cause the machine to perform the operations of:
translating the universal representation of the first audio file into a second audio file, the second audio file comprising audio data compressed using the first compression algorithm but bookkeeping data having a third format, the bookkeeping data specifying a location of the compressed audio data within the second audio file.

22. The machine-readable medium as in claim 21 wherein the bookkeeping data having the first format comprises a priming value indicating a start of the compressed audio data within the first audio file and a remainder value specifying an end of the compressed audio data within the first audio file.

23. The machine-readable medium as in claim 22 wherein the bookkeeping data having the third format comprises an edit media start time indicating a start of the compressed audio data within the second audio file, and a duration value indicating an end of the compressed audio data within the second audio file.

24. The machine-readable medium as in claim 23 wherein the first audio file is an .m4a file, the second audio file is an .mp4 file and the first compression algorithm comprises an Advanced Audio Coding (AAC) algorithm.

25. An apparatus having a memory for storing program code and a processor for processing the program code to perform the operations of:
reading compressed audio data from a first audio file, the first audio file comprising audio data compressed using a first compression algorithm and bookkeeping data having a first format, the bookkeeping data specifying a location of the compressed audio data within the first audio file; and
generating a universal representation of the first audio file without decompressing the audio data, the universal representation having bookkeeping data of a second format specifying the location of compressed audio data within the universal representation.

26. The apparatus as in claim 25 wherein generating the universal representation comprises:
packing the audio data compressed using the first compression algorithm into a plurality of sample buffers.

27. The apparatus as in claim 26 wherein the second bookkeeping data comprises a start trim value and an end trim value associated with each of the sample buffers, the start trim value indicating the location of the start of playable audio data within each sample buffer and the end trim value indicating the end of playable audio data within each sample buffer.

28. The apparatus as in claim 25 wherein the first audio data is stored within the first audio file in a plurality of fixed-size access units and wherein generating the universal representation comprises packing the fixed-size access units into a plurality of audio data structures, the audio data structures of the universal representation being larger than or equal to the fixed-size access units of the first audio file.

29. The apparatus as in claim 28 wherein the fixed-size access units of the universal representation are an integer multiple of the fixed-size access units of the first audio file.

30. The apparatus as in claim 28 wherein the bookkeeping data is packed into the fixed-size audio data structures of the universal representation along with the fixed-size access units.

31. The apparatus as in claim 25 wherein the bookkeeping data having the first format comprises an edit list with a media start time indicating the start of playable audio content within the first audio file and a duration indicating a length of the playable audio content within the first audio file.

32. The apparatus as in claim 25 comprising additional program code to cause the processor to perform the operations of:

reading compressed audio data from a second audio file, the second audio file comprising audio data compressed using the first compression algorithm and bookkeeping data having a third format different from the first format and the second format, the bookkeeping data having the third format specifying a location of the compressed audio data within the second audio file; and generating a universal representation of the second audio file without decompressing the audio data, the universal representation having bookkeeping data of the second format specifying the location of compressed audio data within the universal representation.

33. The apparatus as in claim 25 comprising additional program code to cause the processor to perform the operations of:

translating the universal representation of the first audio file into a second audio file, the second audio file comprising audio data compressed using the first compression algorithm but bookkeeping data having a third format, the bookkeeping data specifying a location of the compressed audio data within the second audio file.

34. The apparatus as in claim 33 wherein the bookkeeping data having the first format comprises a priming value indicating a start of the compressed audio data within the first audio file and a remainder value specifying an end of the compressed audio data within the first audio file.

35. The apparatus as in claim 34 wherein the bookkeeping data having the third format comprises an edit media start time indicating a start of the compressed audio data within the second audio file, and a duration value indicating an end of the compressed audio data within the second audio file.

36. The apparatus as in claim 35 wherein the first audio file is an .m4a file, the second audio file is an .mp4 file and the first compression algorithm comprises an Advanced Audio Coding (AAC) algorithm.

37. An apparatus comprising a memory for storing program code and a processor for processing the program code to perform the operations of:

reading a universal representation of compressed audio data, the universal representation having first bookkeeping data of a first format specifying the location of the compressed audio data within the universal representation, and the compressed audio data being compressed according to a first compression algorithm; and translating the universal representation into an audio file without decompressing the audio data, the audio file comprising audio data compressed using the first compression algorithm and second bookkeeping data having a second format, the bookkeeping data specifying a location of the compressed audio data within the audio file.

38. The apparatus as in claim 37 wherein the universal representation comprises compressed audio data packed into a plurality of sample buffers and wherein the audio file comprises the compressed audio data stored in a plurality of access units.

39. The apparatus as in claim 38 wherein the first bookkeeping data comprises a start trim value and an end trim value associated with each of the sample buffers, the start trim value indicating the location of the start of playable audio data within each sample buffer and the end trim value indicating the end of playable audio data within each sample buffer.

40. The apparatus as in claim 37 comprising additional program code to cause the processor to perform the operations of:

generating the universal representation by reading a second audio file having third bookkeeping data having a third format and audio data compressed according to the first compression algorithm, the universal representation generated without decompressing the audio data.

41. The apparatus as in claim 37 wherein the second bookkeeping data having the second format comprises a priming value indicating a start of the compressed audio data within the first audio file and a remainder value specifying an end of the compressed audio data within the first audio file.

42. The apparatus as in claim 37 wherein the audio file is an .m4a file, an .mp4 file or a .mov file.

* * * * *